Jan. 13, 1970   R. H. BEGIEBING   3,489,264
AUTOMATIC BELT TRACKING CONTROL
Filed April 3, 1968   2 Sheets-Sheet 2

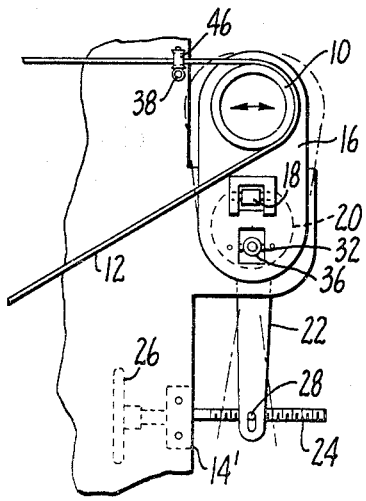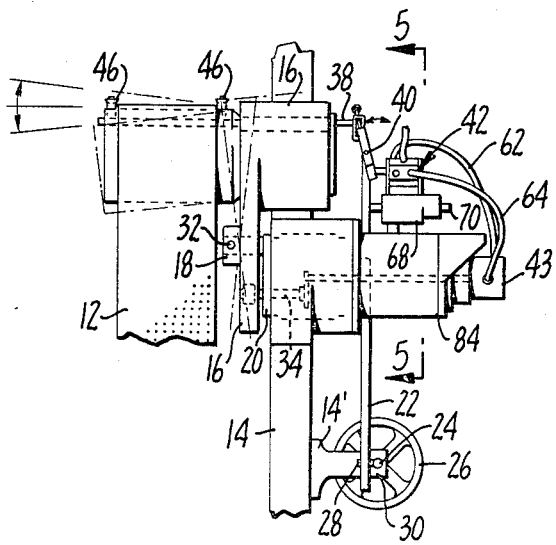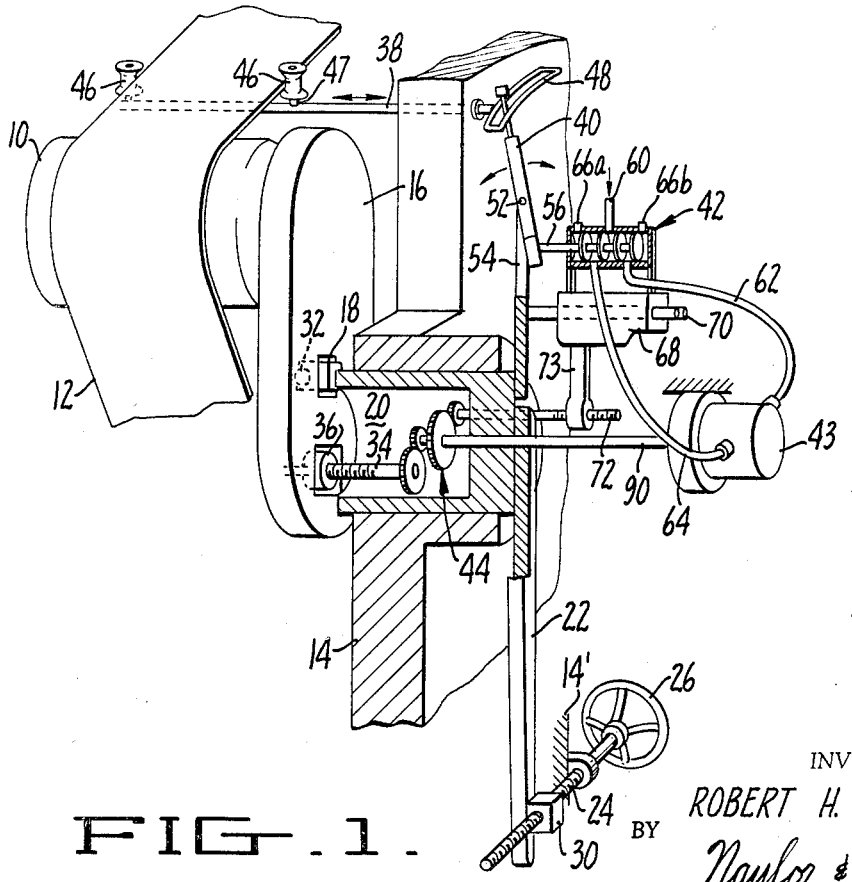

INVENTOR
ROBERT H. BEGIEBING
BY Naylor & Neal
ATTORNEYS

United States Patent Office 3,489,264
Patented Jan. 13, 1970

3,489,264
AUTOMATIC BELT TRACKING CONTROL
Robert H. Begiebing, Pebble Beach, Calif., assignor to American Sugar Company, Salinas, Calif., a corporation of New Jersey
Filed Apr. 3, 1968, Ser. No. 718,555
Int. Cl. B65g *15/62*
U.S. Cl. 198—202          6 Claims

ABSTRACT OF THE DISCLOSURE

An automatic tracking control incorporating a feedback mechanism to prevent hunting or overshoot during belt corrections, the system being particularly suitable for combination with a belt tensioning control, and for incorporation into a unit on which the belt guide rollers are mounted in cantilever fashion.

---

Controlling the tracking of sheeting or belts moving rapidly over rollers can be accomplished by numerous methods including, guides physically preventing shift, specially curved rollers or adjustment of the tilt of a roller. In the art of fruit pressing by serpentine belt systems, the belts are perforated and not sufficiently rigid to be directly controlled by guides. The belts would be subject to buckling or crimping. The use of crowned rollers would interfere with the ability of the belts to retain fruit pulp between them. The most suitable method, therefore, is to tilt a roller to correct any devient tracking of the belt.

Heretofore, most control apparatus for inducing a tilt to a roller have operated by generating a continuing and increasing tilt in a roller when the belt deviates from a home position. Such tilt would continue until the belt again entered the home position. At the time the belt entered the home position, deactivating the mechanism controlling tilt, the belt would be at its maximum corrective position thereon sending the belt across the home position and off in the opposite direction. The belt would tend to continually oscillate back and forth across the fixed home position never stabilizing itself.

Certain developments in the art have provided a feedback type of control to decrease the induced tilt in the roller as the belt returns to its home position, thereby preventing any substantial overshoot.

The present invention relates to such type of apparatus for controlling belt tracking. The present embodiment is highly reactive, but is not subject to continuously hunting a fixed home position. This apparatus reacts to changes in the tracking of a belt rather than to displacements from a fixed home position. When change occurs, a servo-mechanism is operated to induce a corrective tilt in a control roller. Concurrently, the signal operating the servo-mechanism is deactivated regardless of the belt's failure to return to any home position. If the belt makes no further lateral movement, the system will remain deactivated even though the belt is physically displaced from the position it initially maintained. The operation of the apparatus is therefore based on inhibiting movement and change in the present position of the belt.

My invention utilizes a conventional mechanical signal developed from belt tracking sensors to govern a control valve delivering operational signals to a servo-mechanism. The servo-mechanism output both includes a corrective tilt to a control roller and moves the control valve along a guide track in a direction that neutralizes the actuating effect of the mechanical signal from the tracking sensors.

The particular embodiment of the invention conceived allows apparatus for controlled tracking to be combined with a device for belt tensioning in the same roller, thereby dispensing with the necessity of having two separate control rollers. Additionally, the invention can be desirably incorporated in a system of rollers that are mounted to a machine frame in cantilever fashion to facilitate the removal of a continuous serpentine belt. Such a feature is especially desirable for belt-type fruit presses which require frequent cleaning or replacement of the perforated belts used.

These and other important and advantageous features will become apparent from the full disclosure of the preferred embodiment of my invention in the following specification and dawings in which:

FIG. 1 is a schematic view partially in section of the control roller, and of the tracking and tensioning apparatus;

FIG. 2 is an end elevational view of the control roller primarily illustrating the apparatus for tensioning the belt;

FIG. 3 is a side elevational view of the control roller primarily illustrating the apparatus for controlled tracking of the belt;

Figure 6:
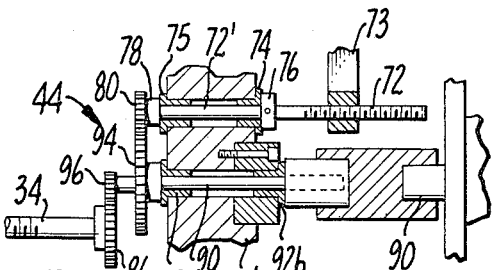
FIG. 6 is an enlarged section view of the gear train and lead screw for controlled tracking of the belt taken along the line 6—6 of FIG. 5.

Referring now in detail to the drawings and in particular to FIG. 1, there illustrated is a conventional idler roller 10 and a serpentine belt 12. The idler roller 10 is connected to the main frame 14 through a pivot arm 16 which is mounted to a rectangular boss 18. The boss 18 protrudes from the extremity of a rotary drum 20 carried in the main frame 14. This arrangement allows both the tracking and the tensioning of the belt 12 to be controlled by the same idler roller.

Since the axis of the idler roller 10 is parallel to but at a distance from the axis of the rotary drum 20, the idler roller 10 may be displaced as illustrated in the phanton lines of FIG. 2, by a rotation of the rotary drum 20. Said rotation is here accomplished by lateral displacement of an extension arm 22 fixed to the rotary drum and manipulated at its opposite extremity by a tensioning jack-screw 24 fixed at one end to the main frame 14'. By turning the handwheel 26 of the tensioning jack-screw, the idler roller 10 may be swung in either direction to adjust the tension of the belt 12 as shown in FIG. 2.

The radial travel of the extension arm can be developed from the linear adjustments of the tensioning jack-screw by using a sliding bearing 28 having vertical travel with a threaded swivel block 30, FIG. 3.

The axis of the idler roller 10 may be tilted as illustrated by the phantom lines of FIG. 3 to adjust the tracking of the belt 12 by pivoting the pivot arm 16 about the extremity of the rectangular boss 18. Here a pin 32 through a horizontal hole in the boss 18, transverse to the axis of the idler roller 10 provides the pivotal axis for tilting the pivot arm 16 and, hence, the idler roller 10. Actual adjustment of the tilt angle is achieved by a jack-screw 34 geared to a servo-mechanism system hereinafter described. The jack-screw 34 which is longitudinally fixed in relation to the rotary drum 20, is threaded into a swivel block 36, FIGS. 1 and 4. The swivel block 36 has its axis of pivot parallel to that of the pin 32 through the boss 18. Since displacement of the pivot arm 16 by the jack-screw 34 will always be small, there is generally no need to mount the swivel block 36 in a sliding bearing to transpose linear into arcuate travel.

The servo-mechanism system comprises a sensing arm 38, a valve lever 40, a valve system 42, an orbital hydraulic motor 43, and a gear train 44. With the exception of the sensing arm 38, the entire servo-mechanism system may uniquely be mounted on the rotary drum 20 rather than on the main frame 14.

Figure 7:
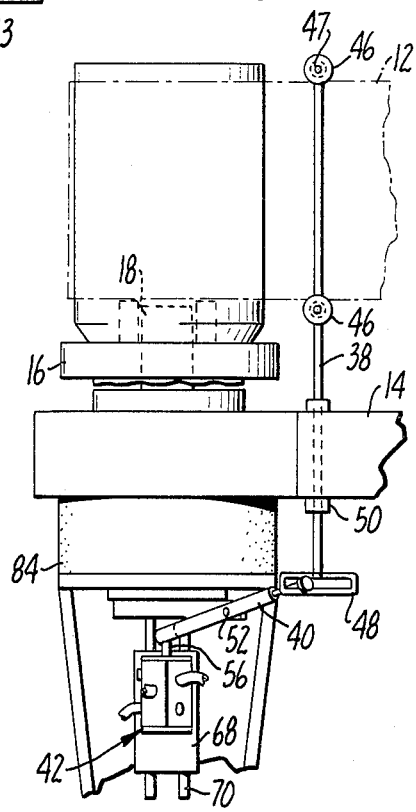
FIG. 7 is a plan view of the control roller.

Turning in particular to FIGS. 1 and 7, two spools 46, bracketing the belt 12 are mounted on pins 47 protruding from the sensing arm 38 perpendicular to the plane of the belt 12. Any shift in the tracking of the belt 12 will push against one of the spools 46 and move the sensing arm 38 in a direction of shift. At the end of the sensing arm 38 is a collar 48 which connects the sensing arm 38 to the valve lever 40. The collar is of the shape illustrated in FIGS. 1, 4, 5, and 7 to accommodate the valve lever 40 in variable positions caused by rotation of the rotary drum 20 to which it is mounted when adjusting the tension of the belt 12 over the idler roller 10. To maintain the same fulcrum position on the valve lever 40 for different tension positions, the collar 48 in the elevational view, as illustrated in FIG. 5, is bent in an arcuate shape about the axis of the rotary drum 20. The sensing arm 38 passes through a sleeve or hole 50, FIG. 7, in the main frame 14 which restricts its movement to linear shifts transverse to the primary direction of belt travel.

Any shift in belt tracking will, therefore, move the collared valve lever 40. The valve lever 40 pivots about a small pin 52, which is mounted on an extension 54 from the rotary drum 20 shown in FIG. 5. The opposite extremity of the valve lever 40 is connected to a valve stem 56 by a ball joint 58 illustrated in FIG. 4.

The valve system 42, illustrated in FIG. 1, is a conventional hydraulic push-pull feeder system. When the valve stem 56 is pushed, the input line 60 supplies the counter-clockwise feed line 62 of the orbital hydraulic motor 43. When pulled, the input line 60 supplies the clockwise feed line 64. Return fluid passes through the line 62 or 64 not being supplied and through one of the output lines 66a or b to the hydraulic supply (not shown).

The valve system 42 mounted on a slider block 68 which can freely slide on two guide rods 70. Movement of the valve system 42 is, however, manipulated by a lead-screw control 72 threaded through an arm 73 extending from the slider block 68. The lead-screw 72 has an unthreaded portion 72' which passes through the ends of the rotary drum 20, as illustrated in FIG. 6, and is fixed from longitudinal movement by a bushing 74 and a pinned collar bearing 76 at the outward side and a bushing 75 and the collar portion 78 of a driven gear 80 at the inward side of the end 20' of rotary drum 20.

Figure 4:
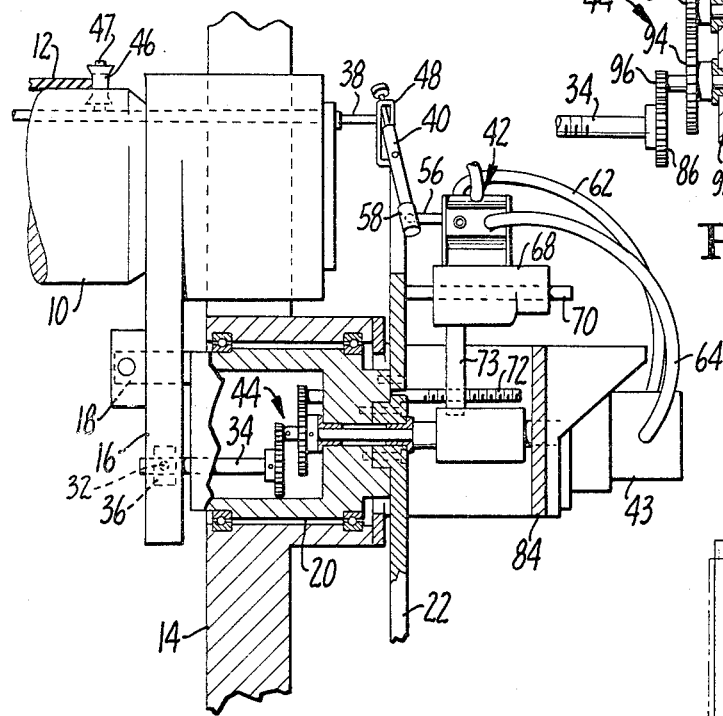
FIG. 4 is a side elevational view partially in section illustrating the internal elements of the idler roller control.
Figure 5:
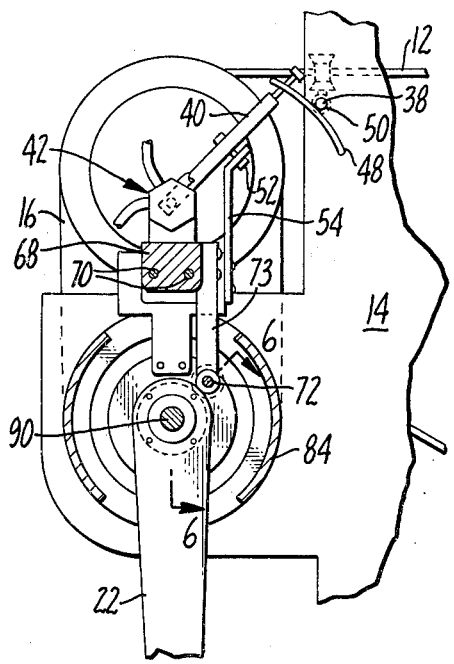
FIG. 5 is an end section view taken along the line 5—5 of FIG. 3.

The orbital hydraulic motor 43, is mounted on an extension to the main frame 84, FIG. 4, serving as a protective shield to the apparatus appended to the rotary drum 20. As an alternative, it may be preferred to mount the orbital hydraulic motor 43 directly on the rotary drum to prevent the lead-screw control 72 and the jack-screw control 34 from being dependently affected, when the rotary drum 20 is rotated to adjust tension of the belt 12. However, in our present embodiment, any maladjustment thereby caused will be small and will automatically be corrected on any shift in the belt.

The orbital hydraulic motor 43 may be of conventional design and adapted to respond rotationally to an impulse of hydraulic fluid from the valve system 42. Additionally, the motor 43 must respond in either direction, clockwise or counter-clockwise, according to the origin of supply fluid.

Turning in particular to FIG. 6, the orbital motor is connected to a drive shaft 90, FIG. 6, which passes through the end 20' of the rotary drum 20 and is guided by bushings 92a and b. Mounted on the end of the drive shaft 90 are two drive gears, 94 and 96. The larger gear 94 drives a gear 80 mounted at the end of the lead-screw control 72 and the smaller gear 96 drives a gear 86 mounted at the end of the jack-screw control 34 for tilt angle adjustment.

OPERATION

The mechanical relationship of the components can most clearly be understood by considering the operation of the automatic tracking. Considering FIG. 1, if the belt 12 were to laterally shift, the sensing arm 38 would be displaced causing the collar 48 of the sensing arm to push or pull the valve lever 40. This valve lever operates the valve stem 56 supplying fluid to one of the feed lines 62 or 64 of the orbital hydraulic motor 43. In response, the motor 43 rotates in the selected direction operating the jack-screw control 34 to create a compensating tilt to the axis of the idler roller 10, and at the same time operating the lead-screw control 72 causing the valve system 42 to be displaced along the guide rod 70 until it reaches the position at which the valve 42 becomes closed. In effect, as the orbital motor 43 is making its compensating adjustments, it is turning itself off. The operation of the orbital motor 43 is not dependent upon the particular position of the sensing arm 38, but is rather sensitive to any change in position of the sensing arm 38. Thus, when the belt moves, the roller 10 is tilted to adjust the tracking of the belt to prevent further movement of the belt in the same direction which causes the initial adjustment.

The gearing ratios are interdependent with changes in their relationship being determinative of the reactiveness of the system. Under the arrangement disclosed, it is clear that the orbital motor 43 driving the lead-screw control 72 will eventually shut itself off. As long as the valve is open, the motor will operate and drive the valve system 42 down the guide rod 70 until a shut-down occurs from the valve stem 56 impinging on the newly positioned valve lever 40. How quickly the valve system is removed to an off position depends on the selection of gear ratio of the larger gear 94 of the orbital motor 43 to the driver gear 80 of the lead screw 72.

During this operation, the orbital motor 43 has also been operating the jack-screw control 34 adjusting the tilt of the idler roller 10. The amount of tilt for a given indicated displacement is primarily dependent upon operational requirements. If exact tracking is not required, the tilt for a given belt displacement need not be great. The system will have a smoother but slower adjustment operation. If the tilt is relatively large for the comparative amount of belt displacement, the system will have a high reactance, but not as smooth an operation. When selecting the particular gear ratio, the valve-system shut-down operation must also be considered. Since the amount of input drive rotation is determined by both the design characteristics of the orbital motor 43 and the quickness of geared shut down, the gear selection for input rotation to the jack-screw must depend in part on consideration of all these factors. When properly coordinated the system will provide a highly efficient method of belt tracking eliminating the overshoot techniques inherent in the systems customarily employed.

I claim:
1. In apparatus for the automatic tracking of a belt over a series of rollers generally connected to a main frame in cantilever fashion to facilitate belt removal, belt tensioning and belt tracking control comprising:
   (A) a freely rotating idler roller;
   (B) a pivot arm attached to one end of said idler roller and fixed to the main frame by means permitting said pivot arm to rotate about a first axis perpendicular but removed from the axis of said idler roller and to concurrently rotate about a second axis parallel to but removed from the axis of said idler roller with said first and second axes not necessarily intersecting;
   (C) belt tensioning means connected to said pivot arm for controlled movement of said pivot arm about said second axis displacing said idler roller in a direction perpendicular to its axis of rotation;
   (D) belt tracking means connected to said pivot arm for controlled movement of said pivot arm about said first axis tilting said idler roller along its axis of rotation;

2. The apparatus of claim 1 in which said means for belt tensioning by controlled movement of said pivot arm comprises a manually operated jack-screw connected to the main frame for rotation with respect to said main frame and threaded to said pivot arm along an axis substantially perpendicular to said second axis and at a point not on said second axis.

3. The apparatus of claim 1 in which said means for belt tracking by controlled movement of said pivot arm comprises an automatically operated jack-screw connected to the main frame for rotation with respect to said main frame and threaded to said pivot arm along an axis substantially perpendicular to said first axis and at a point not on said first axis; said jack-screw operation controlled by an orbital servo-mechanism which is responsive to an activating signal from detectors of belt displacement, said activating signal discontinuing when roller inclination reaches a functional proportion of belt displacement.

4. Control apparatus for the automatic tracking of a belt over a roller by inducing a tilt in the axis of the roller which comprises:
  (A) sensing means for detecting a lateral shift in the tracking of a belt which develops an output signal consisting of a mechanical displacement of a signal element;
  (B) a control valve connected to the signal element of said sensing means and mounted for linear movement, said control valve delivering a hydraulic output when a displacement exists from the relative position of control valve and signal element at which the control valve is hydraulically inactive;
  (C) a hydraulic servo-mechanism controlled in duration and direction of mechanical output by said control valve;
  (D) means dynamically connected to the mechanical output of said servo-mechanism to effect the tilting of the axis of a roller over which a belt tracks;
  (E) feedback means dynamically connected to the mechanical output of said servo-mechanism to effect the linear movement of said control valve directed to attain the relative position of control valve and signal element at which the control valve is hydraulically inactive.

5. The apparatus of claim 4 further characterized by said means connected to said servo-mechanism comprising a gear train in which a drive gear mounted to said servo-mechanism is dynamically connected to a gear fixed on a jack-screw, said jack-screw being threaded to a pivot arm carrying a roller for controlled movement of the pivot arm about an axis perpendicular to and removed from the axis of rotation of said roller.

6. The apparatus of claim 4 further characterized by said feedback means connected to said servo-mechanism comprising a gear train in which a drive gear mounted to said servo-mechanism is dynamically connected to a gear fixed to a lead-screw that imparts linear movement to the control.

References Cited
UNITED STATES PATENTS 3,244,340  4/1966  Fife _____ 226—22

EDWARD A. SROKA, Primary Examiner

U.S. Cl. X.R.

226—21